United States Patent [19]
Sorenson

[11] Patent Number: 6,065,076
[45] Date of Patent: May 16, 2000

[54] SYSTEM FOR TAILORING INFORMATION PRESENTED TO USER AND MANNER OF INFORMATION SELECTION AND PRESENTATION BY HAVING TWO PORTS FOR ACCEPTING SELECTED INFORMATION CARD AND SYSTEM CARD

[75] Inventor: Peter Sorenson, 588 East St., New Haven, Conn. 06515

[73] Assignees: Peter Sorenson, New Haven; Cliff Zoref, Cheshire; Steve Zoref, Weatogue, all of Conn.; a part interest

[21] Appl. No.: 09/031,662

[22] Filed: Feb. 27, 1998

[51] Int. Cl.[7] .............................. G06F 13/10; G09B 5/02; G09B 7/02; H05K 5/03

[52] U.S. Cl. ............................ 710/72; 710/13; 710/73; 345/173; 345/334; 345/337; 345/339; 345/901; 345/905; 345/961; 345/968; 361/681; 463/23; 463/29; 463/43; 434/365

[58] Field of Search ................................ 434/317, 335, 434/365, 429; 361/681, 683; 463/23, 29, 43, 44; 345/173, 334, 337, 339, 901, 968, 961, 905; 710/13, 72, 73

[56] References Cited

U.S. PATENT DOCUMENTS

| D. 284,966 | 8/1986 | Larkins | D14/100 |
|---|---|---|---|
| 4,350,070 | 9/1982 | Bahu | 84/612 |
| 4,679,137 | 7/1987 | Lane et al. | 364/188 |
| 4,820,167 | 4/1989 | Nobles et al. | 434/336 |
| 5,150,294 | 9/1992 | Tateno | 704/7 |
| 5,367,453 | 11/1994 | Capps et al. | 707/531 |
| 5,400,055 | 3/1995 | Ma et al. | 345/168 |
| 5,422,656 | 6/1995 | Allard et al. | 345/173 |
| 5,579,487 | 11/1996 | Meyerson et al. | 710/100 |
| 5,646,649 | 7/1997 | Iwata et al. | 345/173 |
| 5,650,949 | 7/1997 | Kishimoto | 702/155 |
| 5,657,459 | 8/1997 | Yanagisawa et al. | 345/326 |
| 5,663,748 | 9/1997 | Huffman et al. | 345/173 |
| 6,003,052 | 12/1999 | Yamagata | 708/100 |

FOREIGN PATENT DOCUMENTS

| 5-53687 | 3/1993 | Japan . |
|---|---|---|
| 7-295905 | 11/1995 | Japan . |
| WO 94/03887 | 2/1994 | WIPO . |

Primary Examiner—Thomas C. Lee
Assistant Examiner—Ilwoo Park
Attorney, Agent, or Firm—Young & Thompson

[57] ABSTRACT

In a system and method for tailoring information presented to a user and for tailoring the manner of information selection and presentation, an information station accepts user interchangeable information cards and system cards, the user having selected one information card from a series of information cards and having selected one system card from a series of system cards for determining the information presented to the user and for determining the manner of information selection and presentation.

8 Claims, 3 Drawing Sheets

SYSTEM FOR TAILORING INFORMATION PRESENTED TO USER AND MANNER OF INFORMATION SELECTION AND PRESENTATION BY HAVING TWO PORTS FOR ACCEPTING SELECTED INFORMATION CARD AND SYSTEM CARD

BACKGROUND OF THE PRESENT INVENTION

Generally, the present invention relates to the field of communications employing recorded media. More particularly, the present invention relates to a system for maximizing communication effectiveness to a large number of persons while utilizing a limited quantity of communication devices.

The present invention recognizes that, for any particular person, the selection of specific information for presentation and the manner in which such information is actually offered and presented, greatly determines the effectiveness of the communicative effort. The present invention additionally recognizes that to maximize communication effectiveness to a large number of persons while utilizing a limited quantity of communication devices, the communication system must both be flexible as to: 1) how information is offered and presented as well as 2) capable of encompassing a broad range of information presentable at alternative levels of understanding or complexity. Accordingly, the present invention generally relates to a system and method for utilizing a limited number of communication devices to communicate effectively with a large number of persons having first, diverse communication interests and second, a wide range of skills in using typical communication devices and communication interfaces.

The prior art has offered many devices and methods for communicating with recorded media. For the last several years, traditional printed materials have become increasingly supplemented by electronic equivalent devices. For example, pleasure reading materials such as books and magazines, instructional materials such as textbooks and programmed textbooks, and reference materials such as dictionaries, thesauruses, and encyclopedias, have all been supplemented by electronic devices such as electronic books, electronic dictionaries, electronic translators, electronic spelling checkers, as well as general personal computers accessing CD-ROM databases.

Disadvantageously, these examples each tend to address a narrow application, e.g., dictionaries, spellers, and translators, or tend to be complex devices, e.g., powerful personal computers accessing large CD-ROM databases. Further, each of these devices offers limited alternatives in how information is communicated with a user, both in how the information is sought and how the information is displayed. Inexperienced users may be frustrated by the lack of an intuitive user interface, e.g., having to deal with a complex UNIX or a Windows 95 interface. Alternatively, more experienced users may be frustrated by not having direct access to command line programming, e.g., SQL querying of a database.

The disparate needs and capabilities of users may be especially great in places such as schools, libraries, and corporations, where attempting to address the broad range of user needs has resulted in amassing rooms of printed materials, numerous small specialty electronic devices, as well as investing in expensive, complex, and difficult-to-learn computers.

OBJECTS OF THE INVENTION

The present invention overcomes some of the disadvantages of the prior art devices by providing a system and method for utilizing a single communication workstation to effectively communicate with a wide range of users by providing ready reconfiguration of the communication workstation to tailor the workstation's communication environment to an individual user's communication (subject) interest and level of skill in using the workstation.

Accordingly, it is an object of the present invention to provide a novel method of tailoring the information presented by a communication workstation to a user-specified level and of tailoring the manner in which the tailored information is communicated to the user by the selection and use of appropriate interchangeable information and system cards, from sets of such cards, inserted in workstation communication ports.

It is a further object of the present invention to provide a novel method of tailoring information presented by a communication workstation to a user from an information card by the appropriate selection and use of a system card from a set of such system cards.

It is yet a further object of the present invention to provide a novel method of tailoring the means of communication between a user and a communication workstation by the appropriate selection and use of a system card from a set of system cards.

It is still a further object of the present invention to provide a novel communication workstation system utilizing a series of operating system cards and a series of media cards to make subject media selectably accessible by a workstation user and to control access to that media.

It is another object of the present invention to provide a novel skill-adaptive communication tablet adapted to depend upon one of a series of subject matter storage devices and upon one of a series of enabling storage devices to provide selectable access to subject matter information and to selectively enable interface features for accessing available subject matter information.

It is yet a further object of the present invention to provide a communication system having operating and information data in a format not easily copied, thereby discouraging illegal copying, while facilitating easy updates and upgrades by merely replacing old data cards with new data cards.

These and other objects and advantages of the present invention will be apparent to those of skill in the art from a perusal hereof.

SUMMARY OF THE INVENTION

A slim, portable graphics communication tablet provides a system and method for tailoring information presented to a user and for tailoring the manner of information selection and presentation. The user-level tailored graphical interface of the invention permits the use of a lightweight tablet without the requirement for a keyboard or harddrive, yet allows the tablet to communicate with standard computers through an ethernet port or via the Internet through a modem port. The communication tablet functions as an information station accepting user interchangeable information cards and system cards, the user having selected one information card from a series of information cards and having selected one system card from a series of system cards for determining the information presented to the user and for determining the manner of information selection and presentation.

DESCRIPTION OF PREFERRED EMBODIMENTS

A first preferred embodiment of the present invention is a method of allowing a school to tailor both the information presented by a communication station to students as well as the manner in which students interact with the communication station to access the information available from the communication station. In this embodiment, a school has available a number of communication workstations, some of which may be portable.

Figure 1:
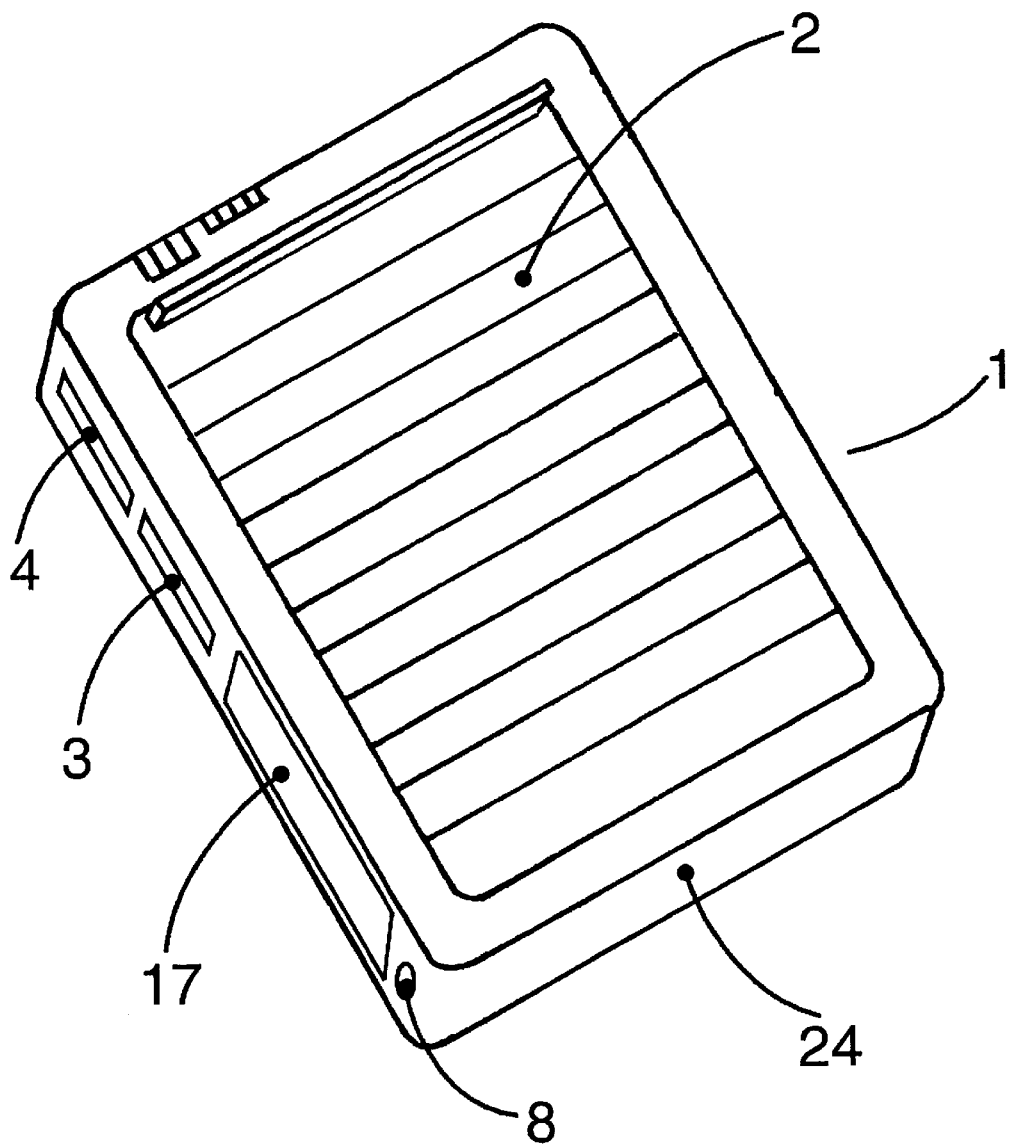
FIG. 1 is a view of an embodiment of the communication tablet of the present invention with a closed protective roll-top display cover.

With reference to FIG. 1, in one preferred embodiment, these communication workstations are portable communication tablets 1. Advantageously, communication tablet 1 includes a roll-top display protective cover 2 which covers and protects an input-capable display (not shown) when the communication tablet 1 is not in use. The input-capable display may allow touch input, pen input, or infrared input. Communication tablet 1 further comprises two externally accessible ports 3 and 4 for receiving student-interchangeable, solid-state digital storage devices, e.g., PCMCIA cards.

Figure 2:
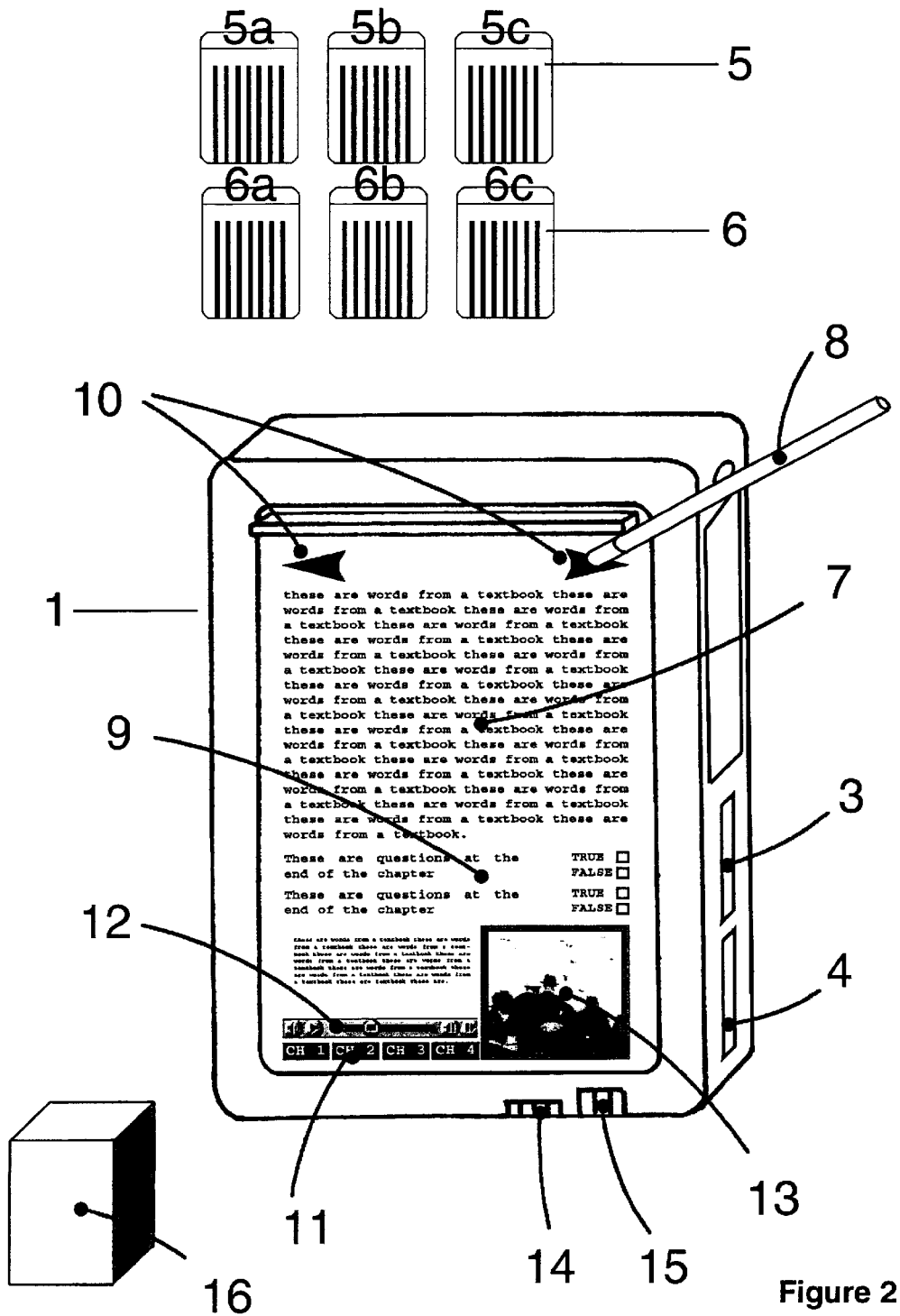
FIG. 2 is another view of an embodiment of the communication tablet of the present invention with the protective roll-top display cover open.

FIG. 2 is another view of an embodiment of the communication tablet 1 of the present invention with the protective roll-top display cover 2 open. In the system of the present invention, the school makes available to students two series of solid-state digital storage devices, a first series of information cards 5 and a second series of operating system cards 6. The student selects (or is given) one card from the information card series 5 for insertion into port 3 and one card of the operating system cards 6 for insertion into port 4.

The information card series 5 is made up of plural information cards, e.g., cards 5A, 5B, and 5C. Each of the information cards 5A, 5B, and 5C contain communication subject matter. For example, information card 5A may include classic novels, while information card 5B may include standardized tests, and information card 5C may include instructional material concerning chemistry. In each of the information series cards 5, the information is organized by student level. For example, information card 5A may include classic novels, each novel having multiple versions appropriate for different audiences. These versions may include an abridged version for a student with limited time available for reading the novel; an annotated version for students interested in in-depth study of the novel; a version in contemporary English for high-school pleasure reading; a version in the author's original language for students desiring an untranslated version; and a version in mixed text and graphics for elementary students learning to read.

The school also has available an operating system card series 6 comprising operating system cards, e.g., cards 6A, 6B, and 6C. Each of the operating system series cards 6 determine what information available on an information card will be available to a student. For example, operating system card 6A may allow a student using information card 5A access to the annotated versions of the novels contained on information card 5A and access to the contemporary English versions of the novels also contained on information card 5A. In this way, the operating systems series cards 6 enable the school to determine what information on the information cards 5 is enabled for a given student's access.

In another embodiment of the present invention which may be used by schools, the operating system cards 6 also determine how the student accesses the information and how the information is presented to the student. At a first level, the operating system series cards 6 determine how a student inputs information into the communication tablet. As discussed above and shown in FIG. 2, the communication tablet may have an input-capable display 7. Display 7 may receive input from an electronic pen 8, by touch directly, or by infrared signal from a remote device 16 such as may be used by a disabled student or used by a teacher remotely controlling the communication tablet 1. Each operating system card 6A, 6B, and 6C may allow all or only a subset of the possible input means to be enabled.

At another level, the operation system cards 6 determine the user interface 9 that is offered by the communication tablet 1 to a student by enabling subsets of features in a skill-adaptive communication interface 9. Features of the interface 9 include simple arrows 10 for indicating advancing through new information or backing up through previously presented information; tabs 11 for directly moving between chapters or, e.g., to a table of contents or an index; audio-visual controls 12 for activating an animation display in interface window 13 and heard through speaker 14; and microphone 15 for audio input to a speech recognition section. While the skill-adaptive communication interface 9 may include such alternatives for input to the communication tablet 1, a school may desirably limit which subset of interface 9 features are enabled for a particular level student. Operating system card 6A may enable the arrow 10 and tab 11 features only; while operating system card 6B may enable microphone 15 and infrared remote device 16; while operating system card 6C may enable all available interface 9 features.

Use of the communication system of the present invention in a school library would obviate the requirement to purchase and shelf many copies of novels and versions of the same novel through the use of information cards 5, which contain plural versions of several novels on a single card, in conjunction with operating system cards 6 which selectively enable access to desired versions of novels contained on an information card 5A as well as tailoring how a student interacts with the communication tablet 1 in proceeding through a novel and how the novel is presented to the student on display 7.

Similarly, in another preferred embodiment of the present invention, schools may conduct student testing without the use of paper tests. Information card series 5 may include an information card 5B containing multiple choice or essay test questions for history classes grades 8 through 12. By using plural information cards 5B in conjunction with a graded set of operating system cards 6, each history class grade 8 through 12 may be tested from the same information cards 5B. A teacher performing the testing may download the test material for all grade levels into an appropriate number of information cards 5B. For example if the smallest class size is 25 and the largest class size is 32, the teacher may download tests into 32 cards and use any card without concern as to whether tests for any specific grade level is on any specific card. Each operating system series card 6A, 6B, and 6C may first enable only a single grade level's examination, e.g., operating card 6A enables grade 8, operating card 6E enables grade 9, etc. The operating cards 6 may second enable feature subsets of the skill-adaptive interface 9 to determine how the examination is presented to the students, e.g., grade 8 tests may include questions displayed using audio-visual images within window 13 and with speaker 14 while grade 12 tests may include multiple windows of mixed text and graphics as part of multiple choice questions. The operating cards 6 may also be graded to allow the skill-adaptive interface 9 to accept input from the students in a relatively simple manner, only using arrows 10 to move between questions and pen 8 to select multiple input answers for the eighth grade to enabling audio input by activating microphone 15 for tenth grade students.

As a further advantage, in this exemplary embodiment, the information series cards are both read and write enabled so that the examination questions are communicated from the teacher to the students via the communication tablet 1 and the answers communicated to the teacher from the students via the communication tablet 1.

As illustrated, the present invention enables communication to become paperless, interactive, and adjusted to the skill level of an individual operator.

Another embodiment of the invention promotes self-paced instruction. Information card 5E includes plural grade level instructional material, e.g., a single card replaces history textbooks for grades 8 through 12, which a student reads and is tested. Operating system series cards 6 determine which grade level material is available to the student and the nature of the test. Operating card 6A may be used for the sixth grade and activate interface 9 features which permit responding to a true/false mini quiz at the end of each completed chapter by using pen 8 to select a true block or a false block presented by interface 9 on display 7. The history lesson is tailored to the progress of the student by additionally providing remedial instruction paths, and additional test questions, when the student does not select the correct answer. This embodiment allows the student to progress through material at a self-established pace while assuring all material is understood. By making the educational communication more enjoyable, interactive, and tailored to the skill and progress of the student, the present invention promotes educational communication while reducing the school's reliance on printed textbooks and teacher resources.

In another embodiment of the present invention, a media card series 5 may include media cards 5A, 5B, and 5C which include movies stored in plural versions. The plural versions may include an uncut director's version, an adult version, a general audience version, and an interactive multi-alternative sequence version. The system of the present invention further includes operating system card series 6 with operating cards 6A, 6B, and 6C. Operating card 6A may enable the general audience version only. Operating card 6A may also enable a subset of interface 9 features which include simple textual and graphic operation choices. Operating card 6C may enable both the adult movie versions and the interactive multi-alternative sequence movie versions on any of cards 5A, 5B, and 5C. Operating card 6C may enable a subset of interface 9 features which include plural windows showing multiple versions of the movie being viewed, may activate microphone 15, for accepting voice commands from the user and may activate remote infrared control device 16 for making alternative sequence selections.

In yet another embodiment of the present invention, entertainment software may be enjoyed utilizing media series cards 5 containing various interactive games and graded operating system series cards 6 enabling the media series cards 5 to be operated at different skill levels. In this way, games can be played by beginners with a level 1 operating system card 6 in which the game and game interface are relatively simple. As the player becomes more adept, the use of a level 12 operating system card 6 enables a version of the game on media series cards 5 which is very intense with intricate output and requiring advance input skills from the user.

Figure 3:
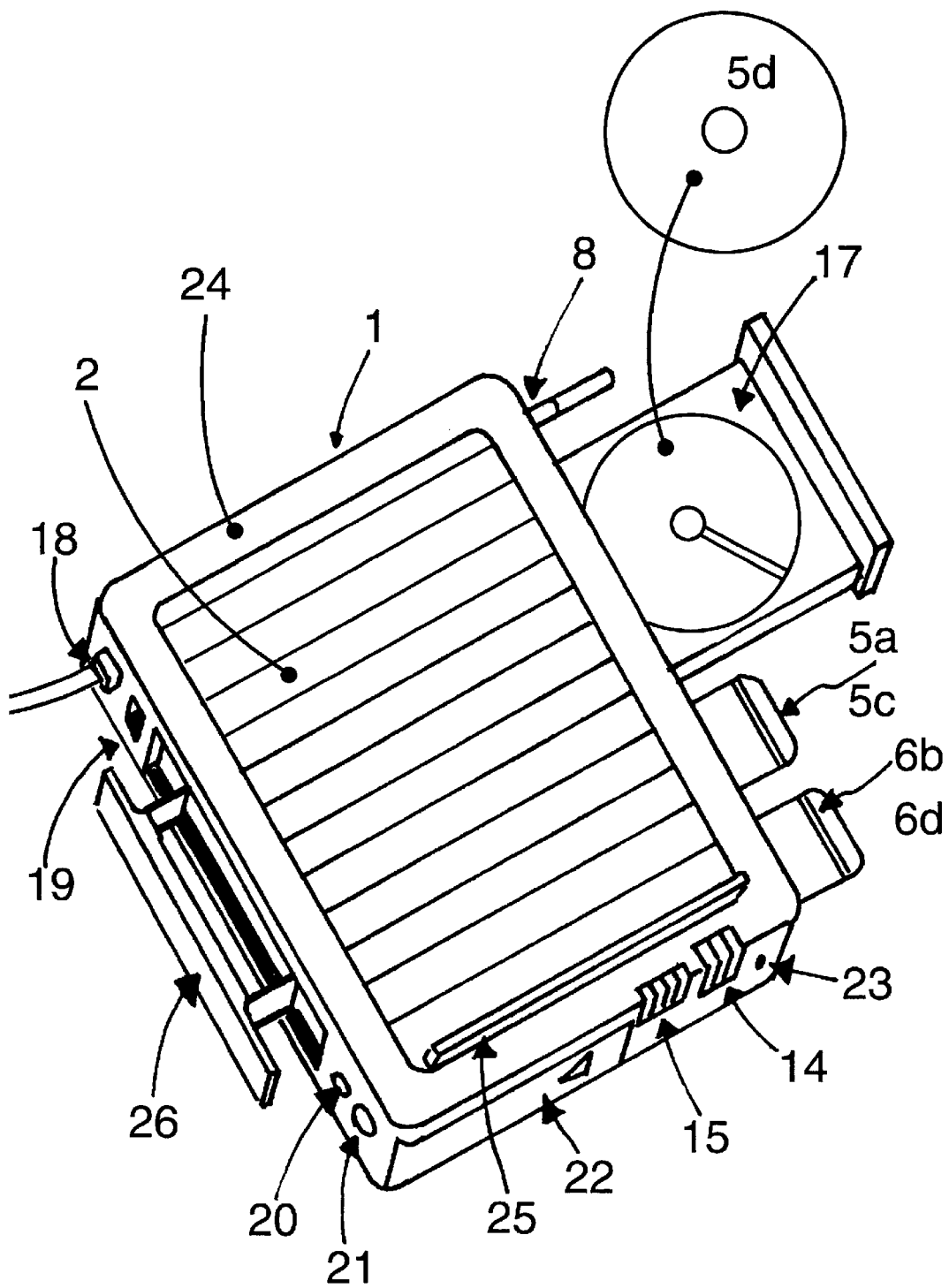
FIG. 3 is a view of an embodiment of the present invention showing additional features.

FIG. 3 illustrates another embodiment of the present invention as a slim, portable microprocessor-based tablet having additional preferred features. This particular embodiment is especially suitable for student use in that the information card series 5 may obviate the need for carrying several, heavy textbooks. By reducing the number of textbooks currently carried by students, the scoliosis-inducing weight of these books, twenty pounds or more, is eliminated. Further by use of an integrated handle 26, and by not requiring a harddrive or keyboard, tablet weight is kept to a minimum.

Through the use of operating system cards 6 to maintain the operating system on a read-only card 6A, illegal copying of the operating system is eliminated. Additional externally accessible ports (not shown) would allow additional capacity and support additional information series cards 5 and operating system series cards 6. In this embodiment, an additional information series card 5C and further an operating system card 6D are supported.

The embodiment of FIG. 3 further includes a CD-ROM drive 17 of a conventional type or of the DVD type. The CD-ROM drive allows for the playing of standard CDs, as well as information series cards in the form of a CD-ROM 5D. Audio material may be heard from speaker 14 or through audio-out port 23 using standard headphones (not shown).

This embodiment is particularly convenient and flexible. Input pen 8 is stored within the shock resistant, shatterproof case 24 of tablet 1. Ethernet connection 18 and modem port 19 ensure interconnectivity with conventional computers and computer networks. Tablet 1 while normally battery powered 21, may be powered through an AC power adapter port 20. Tablet 1 is energized and de-energized by on/off switch 36 or automatically by optional sensor switch 25 which is adapted to energize tablet 1 when roll-top cover 2 is moved away from the closed position, and is adapted to de-energize tablet 1 when roll-top cover 2 is in the closed position (as shown).

While preferred embodiments of the present invention have been described, it is to be understood that the invention is to be defined by the appended claims when read in light of the specification and accorded their full range of equivalence, with changes and modifications being apparent to those of skill in the art. Modifications of the invention herein disclosed will occur to a person skilled in the art and all such modifications are deemed to be within the scope of this invention as defined by the appended claims.

What is claimed is:

1. A skill-adaptive communication tablet comprising:
 a microprocessor, an input-capable display for presenting communication and for receiving user communication, and a portable case having a roll-top display cover serving as a housing and protecting said display;
 two externally accessible ports for communicating with said microprocessor, each said port for receiving a solid-state digital storage device from a different series of plural digital storage devices;
 a first said series of digital storage devices containing communication subject matter, each of said devices in said first series for presenting a different communication subject matter at plural levels;

a second said series of digital storage devices containing enabling instructions for operating said microprocessor and for enabling retrieval and presentation of said communication subject matter at said plural levels by enabling plural subsets of features in a skill-adaptive communication interface and by enabling plural subject matter access levels, each of said devices in said second series for enabling retrieval and presentation of said communication subject matter at one of said plural levels by enabling a selected subset of features in said communication interface, allowing retrieval of subject matter at a selected said subject matter access level by access through said selected feature subset, and by providing microprocessor instructions supporting said access; and a display input device for accepting user communication through contact with said display to activate a said enabled user interface feature, wherein said user activated interface feature retrieves communication from one of said first series of digital storage devices in communication with one of said two externally accessible ports dependent on communication subject matter level enabled through one of said second series of digital storage device in communication with another of said two externally accessible ports.

2. The communication tablet of claim 1, wherein one of said first series of digital storage devices contains user-interactive reading materials, comprising plural forms of presentation of the reading materials, plural methods of proceeding through the reading material, and plural degrees of user-interaction with said reading material, and wherein which of said plural forms of presentation, plural methods of proceeding, and plural degrees of user-interaction are enabled is determined by which one of said second series of digital storage devices is engaged with one of said two externally accessible ports.

3. The communication tablet of claim 2, wherein said second series of digital storage devices comprise a first one of said second series of devices which enables said one of said first series of digital storage devices containing reading materials to present said reading materials in a text-only format accessible through a first selected subset of communication interface features enabled by said first one of said second series of devices; and a second one of said second series of devices which enables said one of said first series of digital storage devices containing reading materials to present said reading materials in a text and pictorial format accessible through a second selected subset of communication interface features enabled by said second one of said second series of devices.

4. The communication tablet of claim 3, further comprising audio input, wherein one of said second series of devices enables a communication audio input feature for accessing reading materials containing within said one of said first series of digital storage devices.

5. The communication tablet of claim 1, wherein one of said first series of digital storage devices contains user-interactive entertainment, comprising plural forms of presentation of said entertainment material and plural methods of proceeding through said entertainment material; and said second series of digital storage devices comprising a first one of said second series of devices which enables said one of said first series of digital storage devices to present said interactive entertainment in a first level of complexity, user directable through a first selected subset of communication interface features enabled by said first one of said second series of devices; and a second one of said second series of devices which enables said one of said first series of digital storage devices to present said interactive entertainment in a second level of complexity, user directable through a second selected subset of communication interface features enabled by said second one of said second series of devices.

6. The communication tablet of claim 5, wherein each of said second series of digital storage devices further enable a level of entertainment difficulty adjusted to the skill level of the individual user.

7. The communication tablet of claim 1, wherein one of said first series of digital storage devices contains interactive instructional material, comprising plural levels of instruction, plural sets of questions testing the effectiveness of said instruction, and plural sets of remedial instruction;

said second series of digital storage devices comprises a first one of said second series of devices which enables a first level of said plural levels of instruction, a first set of said questions, and a first set of remedial instruction, user directable through a selected subset of communication interface features enabled by said first one of second series of devices; and a second one of said second series of devices which enables a second level of said plural levels of instruction, a second set of said questions, and a second set of remedial instruction, user directable through said selected subset of communication interface features enabled by said second one of said second series of devices.

8. The communication tablet of claim 7, further comprising pen input means;

wherein one of said second series of devices enables a pen-based communication input feature for accessing instructional materials contained within said one of said first series of digital storage devices, and for receiving user input responsive to said questions contained within said one of said first series of digital storage devices.

* * * * *